United States Patent [19]
Ishii

[11] Patent Number: 5,860,089
[45] Date of Patent: Jan. 12, 1999

[54] DISK SYSTEM WITH COMMAND PROCESSING FUNCTION

[75] Inventor: Shuichi Ishii, Tokyo, Japan

[73] Assignee: Kabushiki Kaisha Toshiba, Japan

[21] Appl. No.: 790,707

[22] Filed: Jan. 29, 1997

[30] Foreign Application Priority Data

Sep. 19, 1996 [JP] Japan .................................. 8-247791

[51] Int. Cl.⁶ .................................................. G06F 13/14
[52] U.S. Cl. ........................................... 711/112; 395/825
[58] Field of Search .................... 711/111, 112; 395/825, 395/826; 364/47, 51, 218.1; 360/48

[56] References Cited

U.S. PATENT DOCUMENTS

| | | | |
|---|---|---|---|
| 3,972,030 | 7/1976 | Bailey, Jr. ................................ | 395/825 |
| 4,803,622 | 2/1989 | Bain, Jr. et al. ........................ | 364/200 |
| 4,942,552 | 7/1990 | Merrill et al. ........................... | 395/826 |
| 5,008,808 | 4/1991 | Fries et al. .............................. | 395/826 |
| 5,131,082 | 7/1992 | Bonevento et al. .................... | 395/825 |
| 5,249,279 | 9/1993 | Schmenk et al. ....................... | 395/825 |
| 5,339,449 | 8/1994 | Karger et al. ........................... | 395/826 |
| 5,426,744 | 6/1995 | Sawase et al. .......................... | 395/375 |

FOREIGN PATENT DOCUMENTS

7-129327  5/1995  Japan .................................. G06F 3/06

*Primary Examiner*—Tod R. Swann
*Assistant Examiner*—Christopher S. Chow
*Attorney, Agent, or Firm*—Limbach & Limbach LLP

[57] ABSTRACT

A disk controller (HDC) constituting an interface between a disk drive (HDD) and a host system executes a series of command processes on a command issued from the host system. The HDC includes a command processing unit composed of command processing circuits that divide the series of command processes into a plurality of command processing steps and execute the individual command processing steps independently. Each of the command processing circuits is constructed so that its operating state may be controlled by the status code set in the command status register included in a command status circuit. The CPU of the HDD can refer to and change the command status register. Furthermore, the CPU decodes the specific command from the host system that the HDC does not support and controls the command processing unit via the command status circuit. This enables the CPU to cause the command processing unit to process the specific command.

13 Claims, 7 Drawing Sheets

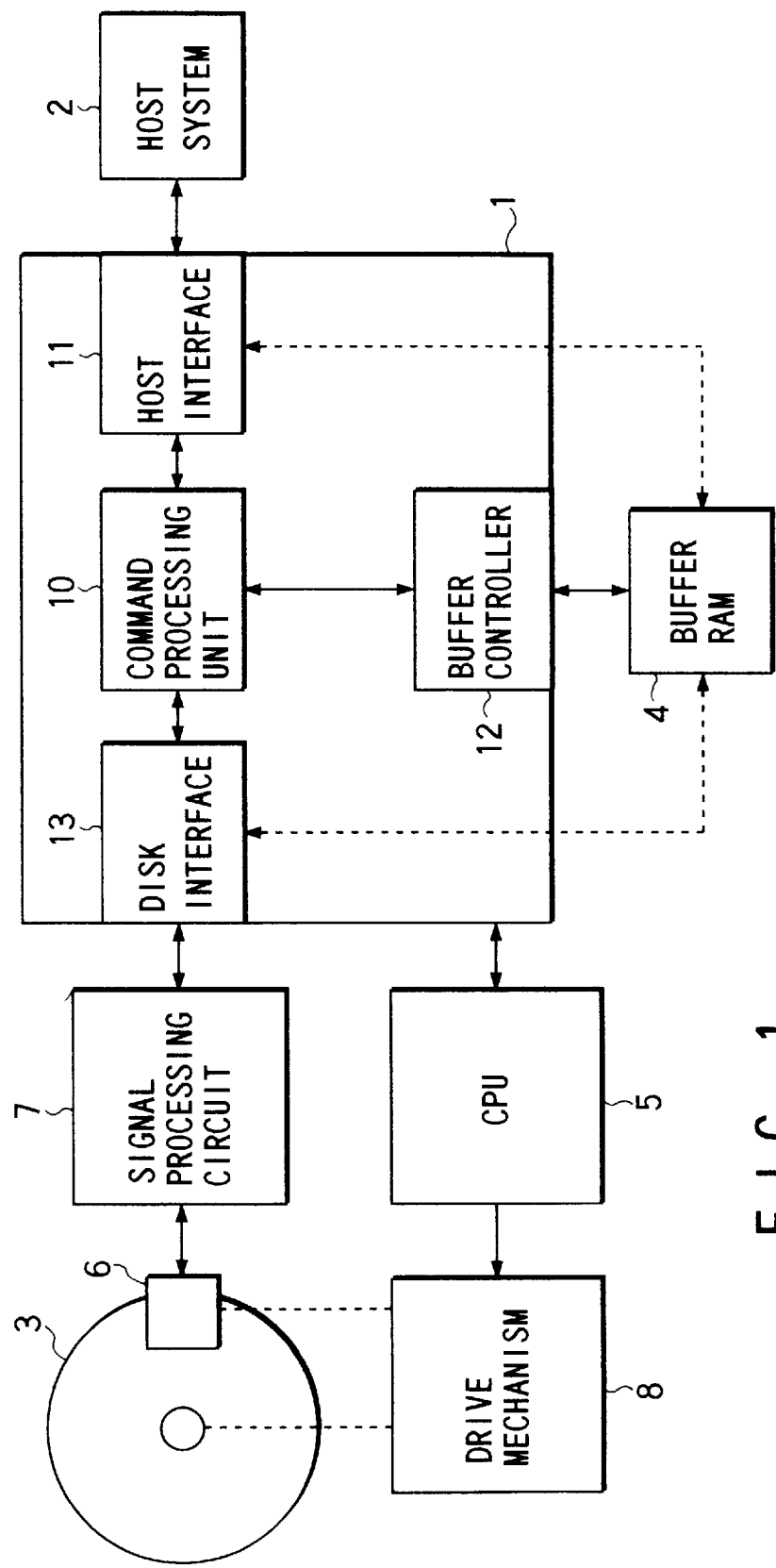
F I G. 1

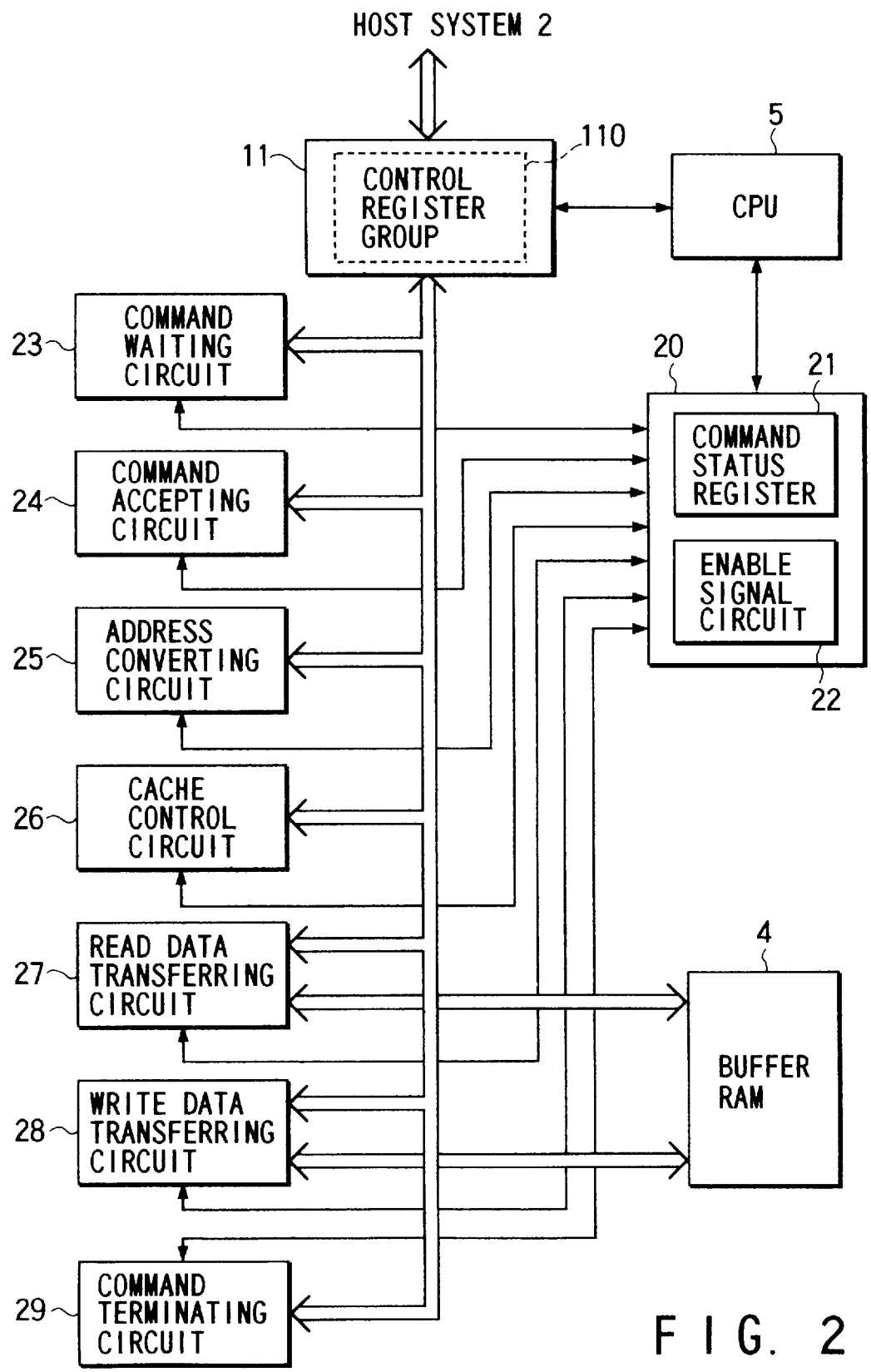
F I G. 2

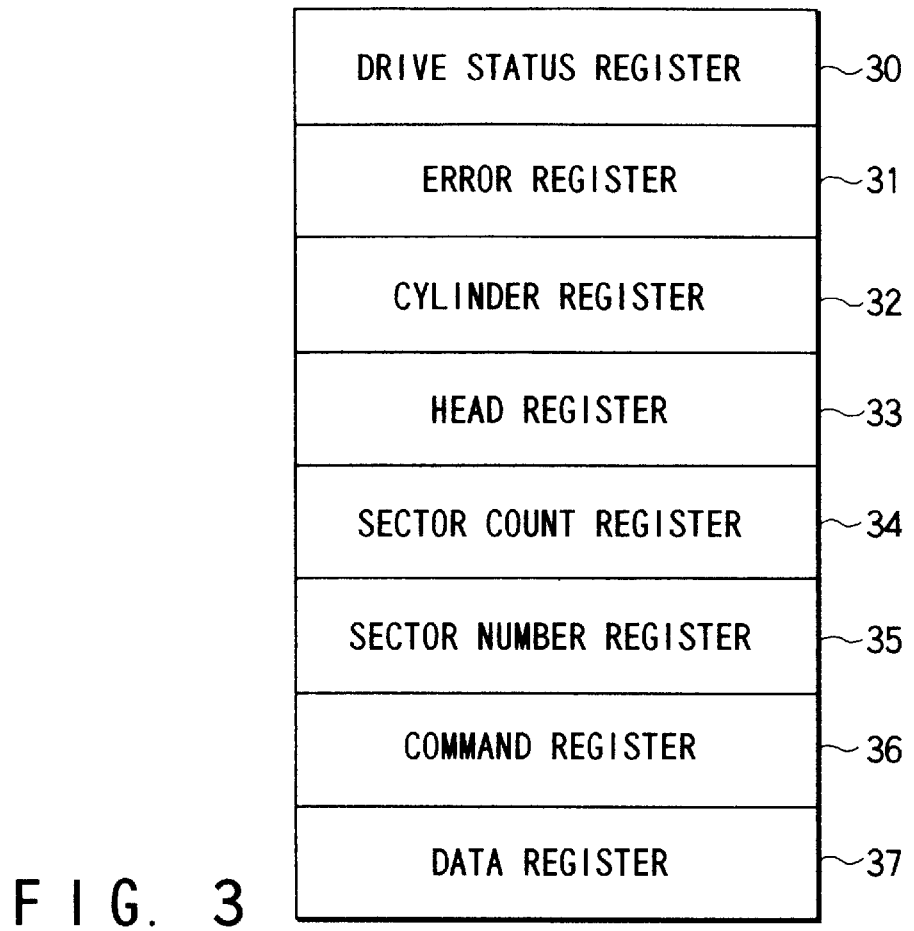
FIG. 3
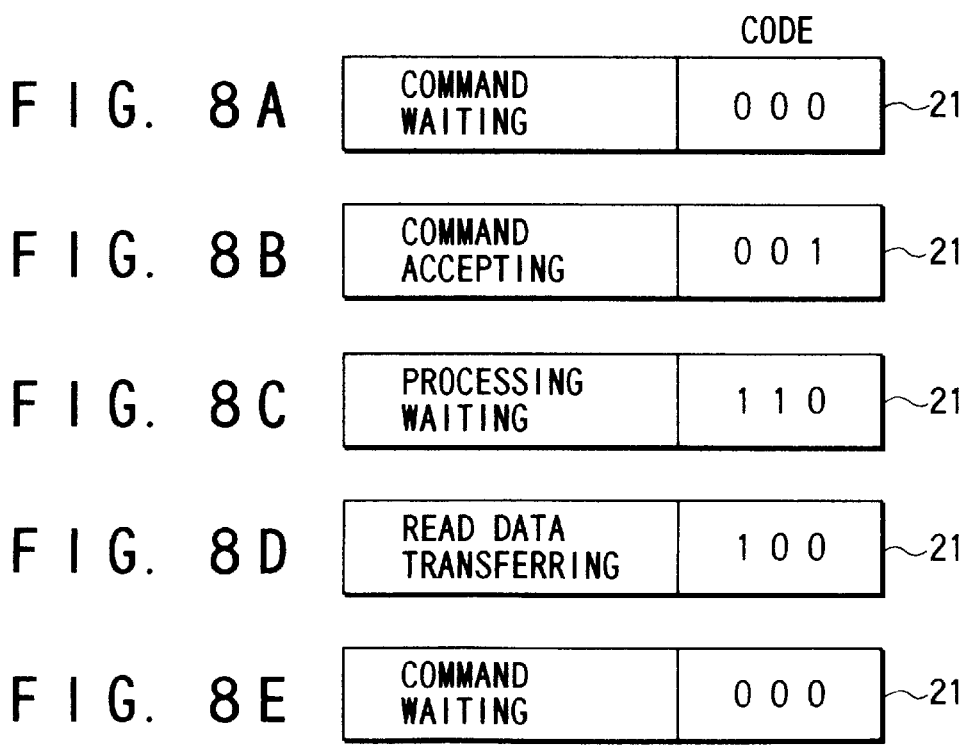
FIG. 8A
FIG. 8B
FIG. 8C
FIG. 8D
FIG. 8E

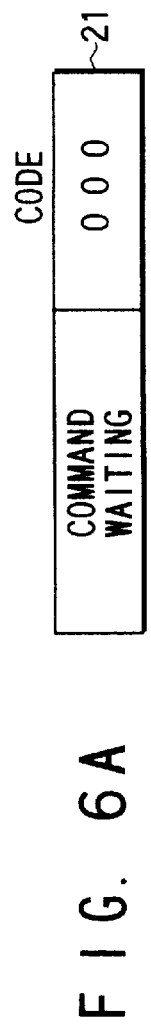
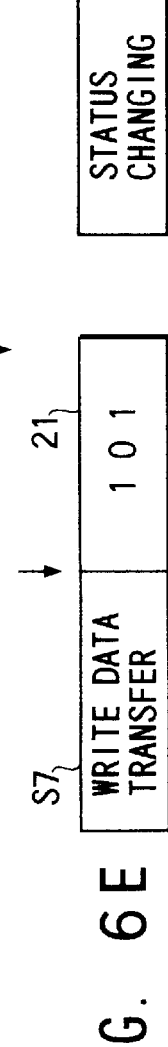
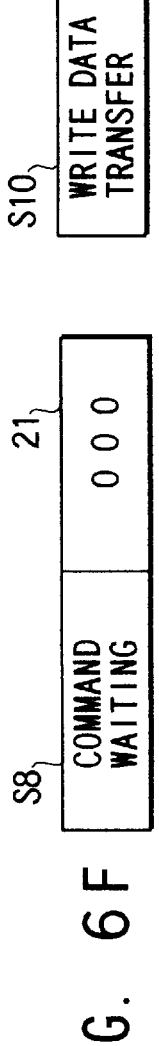

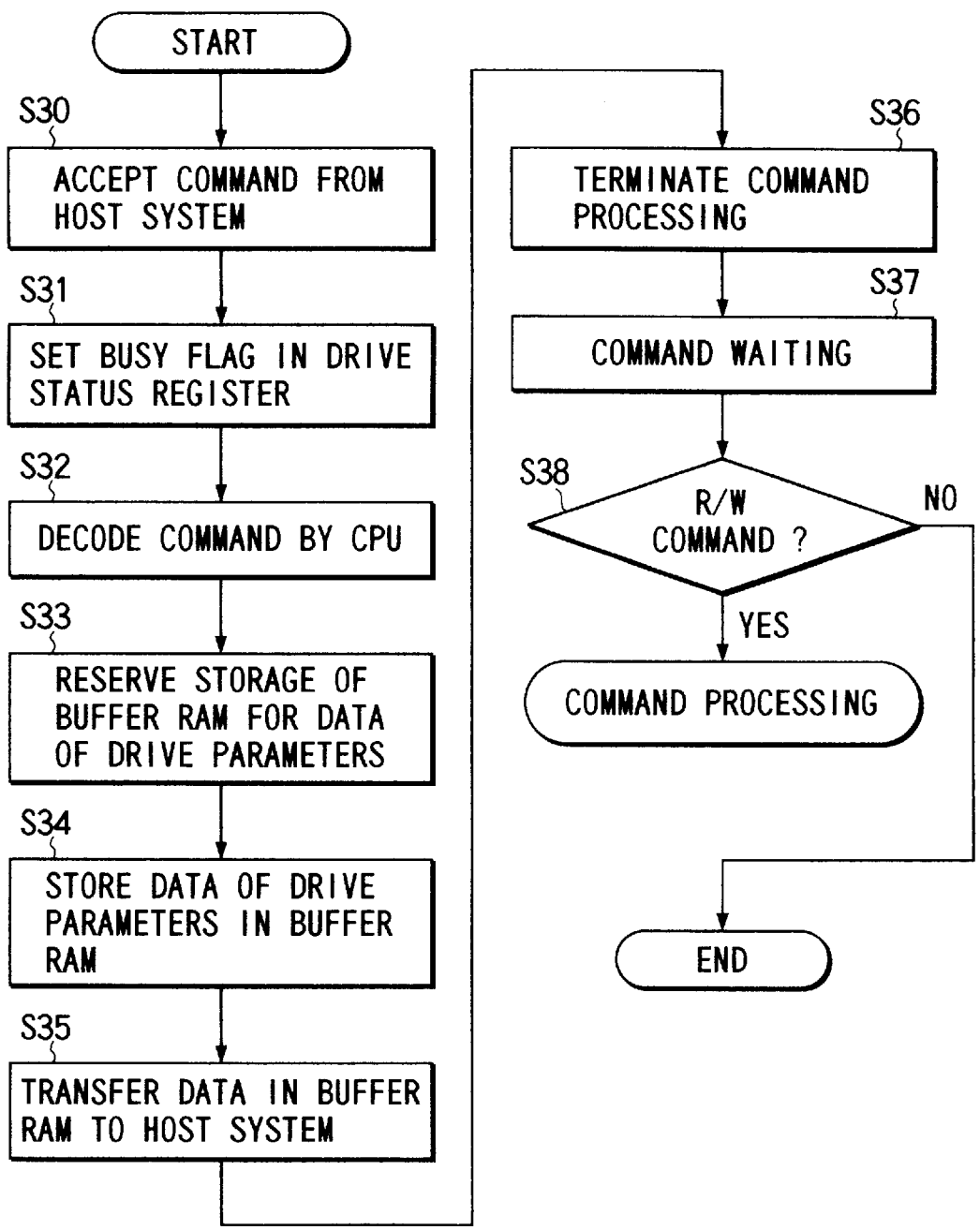
F I G. 7

DISK SYSTEM WITH COMMAND PROCESSING FUNCTION

BACKGROUND OF THE INVENTION

This invention relates to a drive control apparatus which is applied to a disk storage system, such as a hard disk drive or an optical disk drive, has an interface function between a disk drive and a host system, and particularly controls data transfer.

A conventional external storage device, such as a hard disk drive (HDD), is generally incorporated in the body of a personal computer or provided outside a personal computer, for example. According to a command from the computer body (hereinafter, referred to as the host system), the storage device stores the data on a disk serving as a recording medium or reads the data from the disk and transfers it to the host system.

The HDD is roughly composed of a drive mechanism, a microcontroller, and a drive controller. The drive mechanism is roughly divided into a spindle mechanism that holds a disk in place and rotates it and a head driving mechanism that drives a head. The microcontroller is mainly made up of a microprocessor (CPU) and provides recording/reproducing control of data to a disk, head driving control, and disk rotating control.

In the HDD, the drive controller is also called a hard disk controller (HDC) and constitutes an interface between the disk drive and the host system and provides data transfer control (HDD data input/output control) between them. Receiving a command issued from the host system, the HDC executes a series of command processes and carries out data transfer control between the host system and the disk drive. In data transfer, the HDC uses a buffer memory (buffer RAM) to store the write data from the host system or the read data read from the disk into the buffer memory. In the write command processing, the HDC transfers the write data from the buffer memory to the disk. The write data is transferred as far as the head in the form of write current and is magnetically written on the disk. In the read command processing, the HDC transfers the read data from the buffer memory to the host system.

The command processing executed by the HDC starts with a command accepting process, followed by a series of processes, including a command recognition process, a BUSY setting process, a cache hit judging process, a data transfer process, a command address updating process, an interrupt generating process, and a BUSY clearing process. Hereinafter, the series of command processes, including the related operation of the CPU and buffer RAM, will be explained.

When the host system has issued a command (a read command or a write command), the HDC accepts the command and executes the process of recognizing the command. At this time, the HDC sets a BUSY flag in a drive status register 30 included in a control register group (see FIG. 3) in the HDC (BUSY set process), the BUSY flag indicating that the disk drive is in the BUSY state (during command execution). In the drive status register 30, for example, an error flag indicating that an error has occurred in the preceding command execution, a flag indicating a data transfer request, and a flag indicating that the disk drive is in the READY state (the command wait state) are set in addition to the BUSY flag.

The control register group is a register group which can be referred to by the host system and the CPU of the HDD and which includes an error register 31, a cylinder register 32, a head register 33, a sector count register 34, a sector number register 35, a command register 36, and a data register 37, in addition to the drive status register 30, as shown in FIG. 3, under the IDE (intelligent drive electronics) interface standard or the ATA interface standard. The error register 31 holds the contents of an error in the operation of the HDD. The cylinder register 32 holds the cylinder (track) number to be accessed on the disk. The head register 33 holds the head number selected in the HDD. The sector count register 34 holds the number of sectors transferred. The sector number register 35 holds the logical sector number obtained by address conversion in the command process. The command register 36 holds the command from the host system. The data register 37 holds the write data in the case of a write command and the read data in the case of a read command.

The HDC recognizes in a command recognition process whether the command is a write command, a read command, or a specific command other than a write and read commands. When it is a specific command other than a write and read commands, the HDC will pass control to the CPU. In the case of a read or write command, the HDC executes a cache hit judging process. In the cache hit judging process, it is judged whether the same address has been accessed. Specifically, in the case of a write command, it is judged whether or not an address to be accessed has been secured in the buffer RAM. If it has been secured (hit), the HDC stores the write data transferred from the host system at the address secured in the buffer RAM. In the case of a read command, it is judged whether or not the read data has been stored at the address to be accessed in the buffer RAM. If it has been stored (hit), the HDC reads the relevant read data from the buffer RAM and transfers it to the host system. Namely, the HDC transfers the read data directly from the buffer RAM to the host system without accessing the disk of the HDD. This eliminates the time required to access the disk and achieves high-speed data transfer.

After the CPU has prepared for data transfer, the HDC executes the data transfer process according to the data transfer instruction from the CPU. When the address to be accessed has not been hit in the cache hit judging process in the case of a write command, the HDC stores the write data in the buffer RAM after the CPU has prepared for reception of the write data (has secured an address in the buffer RAM). Additionally, when the address to be accessed has not been hit in the cache hit judging process in the case of a read command, the HDC stores into the buffer RAM the read data read from the disk under the control of the CPU. Furthermore, the HDC updates the command address, clears the BUSY flag after the CPU has issued a command end instruction, and goes to the command reception state. Namely, the HDC sets in the drive status register 30 a flag indicating that the disk drive is in the READY state.

As described above, after receiving a command from the host system, the HDC executes a series of commands one after another, and changes the various flags according to the contents of each of the command processes. The method of executing such a series of command processes serially, however, results in the complicated structure of the HDC because the method has a lot of condition flags and executes various operations according to the condition flags. This makes it very difficult to find defects in the processing steps in the stage of designing the HDC. Even if defects have been found after the HDC has been designed, it is impossible, for example, for a CPU to correct the defects and execute part of the command processing substitutively. To solve the problem, it is desirable that the series of command processes should be divided into a plurality of command processing steps and each of the common processing steps be executed independently. Furthermore, a method of enabling a CPU to refer to the operating state of each of the command processing steps is preferable. These methods, however, have not been realized yet.

BRIEF SUMMARY OF THE INVENTION

The object of the present invention is to divide a series of command processes to be executed by a drive controller into a plurality of command processing steps so as not only to execute each of the command processing steps independently but also to enable a CPU to grasp the operating state of each command process. This helps simplify the design of a drive controller, such as a HDC, and increase the flexibility of the command processing function.

The foregoing object is accomplished by providing a drive controller comprising: command processing means composed of a plurality of command processing circuits that accept the commands issued from the host system and, when a series of command processes is divided into a plurality of command processes, execute each of the command processes independently; command status means for holding the status code set for each of the command processes and telling the command processing circuit for executing the command process corresponding to the status code that the command processing circuit is in an enable state; control means for causing the relevant command processing circuit to execute the command process corresponding to the status code held in the command status means and setting and updating the status code for specifying a subsequent command process in the command status means when each of the series of command processes has been completed; and data transfer means for, according to the data transfer process in the data transfer processing circuit included in each of the command processing circuits, either transferring to the disk drive the data specified on the basis of a command from the host system or transferring to the host system the data specified on the basis of a command from the host system.

With such a configuration, it is possible to execute each of a series of command processes after acceptance of a command from the host system independently by changing the status code in the command status means. Referring to the command status means, the CPU can always grasp the operating state of the command processing. Furthermore, by changing the status code in the command status means, the CPU can recognize, for example, a specific command from the host computer and process the specific command. This makes it easy to examine the contents of each of the commands and change and modify the contents of process in making a design in connection with the command processing unit. Still furthermore, it is easy to add not only a new command process but also such a function as adds the function of causing a CPU to perform a specific command process, resulting in the increased flexibility of the command processing function.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of the important sections of a disk storage system associated with the present invention;

FIG. 2 is a block diagram of the important sections of an HDC associated with the present invention;

FIG. 3 is a block diagram of the control register group in a conventional HDC;

FIGS. 6A to 6I illustrate how the command status register changes in the first embodiment;

FIG. 7 is a flowchart to help explain a specific command process according to a second embodiment of the present invention; and FIGS. 8A to 8E illustrate how the command status register change in the second embodiment.

DETAILED DESCRIPTION OF THE INVENTION

Figure 4:
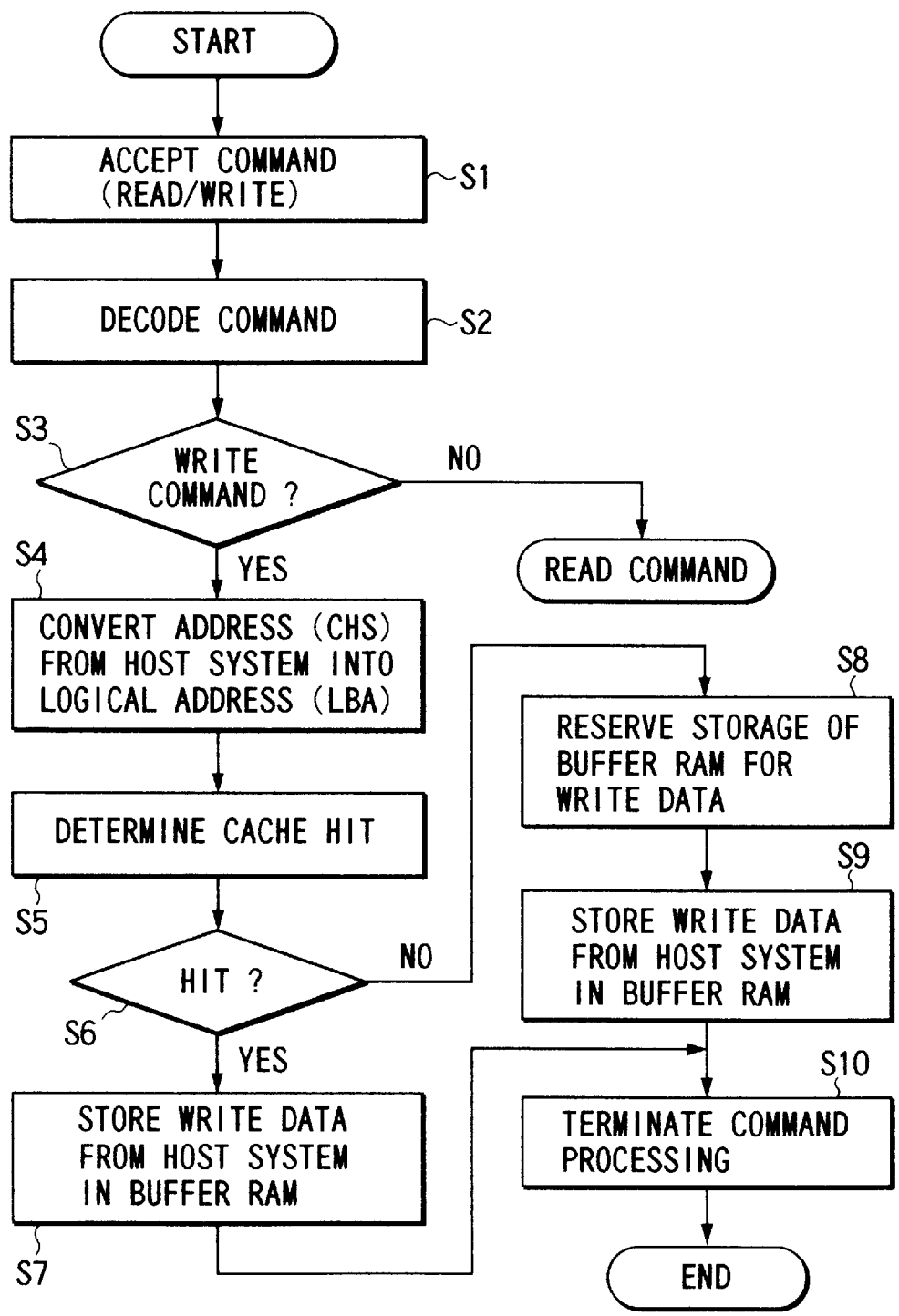
FIG. 4 is a flowchart to help explain a write command process according to a first embodiment of the present invention.

Hereinafter, referring to the accompanying drawings, embodiments of the present invention will be explained.
(Configuration of disk storage system)

FIG. 1 is a block diagram of a disk storage system, such as an HDD, according to an embodiment of the present invention.

As shown in FIG. 1, the disk storage system is roughly composed of an HDD, a disk controller 1 (HDC) 1, and a host system 2. The host system 2 is a personal computer, for example. The host system is mainly made up of a CPU and includes an OS and software, such as application software.

The HDD includes a disk serving as a recording medium, a head 6, a signal processing circuit 7, a drive mechanism 8, and a microcontroller (whose main component part is a CPU and hereinafter which is referred to as the CPU) 5. The disk 3 is rotated at high speed by the spindle motor included in the drive mechanism 8. The head moving mechanism included in the drive mechanism 8 moves the head 6 over the radius of the disk 3 and locates it in a position (the cylinder including the sector to be accessed) on the disk 3 to be accessed.

The signal processing circuit 7 is a circuit for performing a read/write signal process that reproduces the read data from the read signal read by the head 6 from the disk 3 and outputs to the head 6 the write signal following the write data transferred from the host system 2 via the HDC 1. The CPU 5 is the main control unit of the HDD and provides rotational control of the disk 3, moving control (servo control) of the head 6, and recording and reproducing control of the read and write data to the disk 3. Furthermore, the CPU 5 has the function of reading and writing various types of control information from and into the control register group provided in the HDC 1 and controlling data transfer executed by the HDC 1. In the present invention, the CPU 5 has the function of referring directly to or updating the status code of the command status register provided in the command processing unit 10 of the HDC 1 as explained later.

The HDC 1 is generally a drive controller built in the HDD and an interface between the host system 2 and the drive and executes transfer control of read/write data. The HDC 1 includes a host interface 11 on the host system 2 side and a disk interface 13 on the drive side (disk side). The HDC 1 controls the buffer RAM 4 via a buffer controller 12 so as to temporarily store the read data or write data, thereby achieving the function of adjusting the data transfer speed and a cache memory function (corresponding to the function of processing a command at high speed). The buffer RAM 4 is also called the sector buffer and usually holds the read or write data in sectors.

(Configuration of the command processing unit)

The HDC 1 of the present invention includes the command processing unit 10 having a hardware structure. The command processing unit 10 exchanges control data, including commands and status codes, with the CPU 5. FIG. 2 is a block diagram of the command processing unit 10 and its peripheral circuitry.

The command processing unit 10 includes command processing circuits 23 to 29 for performing a series of command processes on commands, such as read and write commands, inputted from the host system 2 via the host interface 11 and a command status circuit 20. The host interface 11 includes a control register group 110 used equally in all command processes. Besides the various registers 30 to 37 shown in FIG. 3, the control register group 110 includes a hit address entry register and a flag register for holding a hit flag.

The command processing unit 10 of the present invention is composed of the command processing circuits 23 to 29 so as to divide the series of command processes into a plurality of command processing steps and execute each command processing step independently. Each of the command processing circuits 23 to 29 is made up of a special logic circuit for executing each command process and operates in relation to the command status circuit 20 as described below.

The command status circuit 20 is roughly composed of a command status register 21 and an enable signal circuit 22. The command status register 21 holds a status code (XXX in three bits) set for each of the command processes corresponding to the command processing circuits 23 to 29. In the command status register 21, the status code is set by each of the command processing circuits 23 to 29 or CPU 5. The status code is a code indicating which of the command processes is in the execution state (enable state). Namely, the status codes are set so as to correspond to the command processing circuits 23 to 29 on a one-to-one basis. Therefore, the command processing circuits 23 to 29 do not operate simultaneously but operate in sequence according to the change (update) of the status code.

Referring to the status code set in the command status register 21, the CPU 5 recognizes which one of the series of command processes is being executed or is to be started. The enable signal circuit 22 outputs an enable signal to one of the command processing circuits 23 to 29 that is to execute the command process corresponding to the status code set in the command status register 21 and causes the command processing circuit to operate.

The command status circuit 20 updates the status code in the command status register 21 in response to the update request from the command processing circuits 23 to 29. The command processing circuits 23 to 29 may update the status code directly. The CPU 5 is capable of referring to the status code in the command status register 21 and writing and changing (updating) the status code.

Next, the function of each of the command processing circuits 23 to 29 and the status code set for the sake of convenience in the embodiment will be explained.

The command waiting circuit 23 is a circuit for monitoring the command issue from the host system 2 and operates when the status code in the command status register 21 is "000" in the embodiment. Once recognizing the issuing of the command, the command waiting circuit 23 outputs an update request to update the status code in the command status register 21 to "000." Hereinafter, in the embodiment, for the sake of convenience, it is assumed that each of the command processing circuits 23 to 29 updates the status code in the command status register 21 directly. The command waiting circuit 23 also has the function of clearing the BUSY flag in the drive status register 30 included in the control register group 110 and generating an interrupt to the host system 2 when the command process has been completed and the status code in the command status register 21 has changed to "000." The interrupt process to the host system 2 is executed via the interrupt signal output circuit included in the host interface 11.

The command accepting circuit 24 is a circuit that accepts the issued command and performs the command recognition process of judging the contents of the command. The command accepting circuit 24 operates when the status code in the command status register 21 is "001," sets a BUSY flag (a flag indicating the command executing state) for the host system 2, and changes the status code according to the type of command. Specifically, the command accepting circuit accesses the disk 3 and changes the status code to "010" when the command is a command accompanied by data transfer with the host system 2 (a write command or a read command), or changes the status code to "110" when the command is a command other than the above command (a specific command explained later).

The address converting circuit 25 is a circuit that operates when the status code is "010" and converts the address to be accessed from the host system 2 into a specific address. Specifically, when the address specified by the host system 2 is a physical address (CHS) consisting of a cylinder number, a head number, and a sector number, the address converting circuit 25 converts the CHS into a logical block address (LBA), a serial address. The address converting circuit 25 converts the status code into "011."

The cache control circuit 26 operates when the status code is "011," and compares the address (cache hit address LBA) registered at the end of the preceding command with the address (LBA) of the present access request, thereby deciding whether to hit the address. When hitting the address, the cache control circuit 26 changes the status code to "101" in the case of a write command and to "100" in the case of a read command. When not hitting the address, it changes the status code to "110."

The read data transferring circuit 27 is a circuit that operates when the status code is "100" and performs the process of transferring the read data stored in the buffer RAM 4 to the host system 2. The read data transferring circuit 27 normally updates the command execution address each time the read data is transferred in sectors, and after having transferred the requested read data, changes the status code to "000."

The write data transferring circuit 28 is a circuit that operates when the status code is "101 " and transfers the write data from the host system 2 to the buffer RAM 4, which stores it. The write data transferring circuit 28 normally updates the command execution address each time it receives the write data in sectors and after having received the requested write data, changes the status code to "000."

The command terminating circuit 29 is a circuit that operates when the status code is "110" and waits for the CPU 5 to perform control. The command terminating circuit 29 waits for the CPU 5 to operate the command status register 21 and does not change the status code (request the change of the status code) by itself.

(Command process in the first embodiment)

Hereinafter, the read and write command processes in the first embodiment will be described by reference to FIGS. 4 and 6A to 6I.

First, the write command process will be described by reference to the flowchart in FIG. 4 and the change of the command status register 21 shown in FIGS. 6A to 6I.

In the command issue wait state, status code "000" is set in the command status register 21 as shown in FIG. 6A. When the host system 2 has issued a write command, the command waiting circuit 23 senses the command and set the status code in the command status register 21 at "001" (see FIG. 6B).

The command accepting circuit 24 executes a command accepting operation according to status code "001" and sets a BUSY flag in the drive status register 30 included in the control register group 110 in order to tell the host system 2 that a command process is to be started (or is in progress) (step S1). Then, the command accepting circuit 24 executes a command recognition process and recognizes that the command issued by the host computer 2 is a write command (S2 and YES in step S3). In the case of a write command, the command accepting circuit 24 changes the status code in the command status register 21 to "010" (see FIG. 6C).

When the command issued by the host system 2 is a specific command other than a read and write commands, the command accepting circuit 24 sets status code "110" in the command status register 21 (see FIG. 6G and FIG. 8C).

The address converting circuit 25 operates according to status code "010" and, when the command execution address specified by the host system 2 is a physical address (CHS) consisting of a cylinder number, a head number, and a sector number, converts it into a logical block address (LBA), a serial address (step S4). The address converting circuit 25 sets the converted logical block address (LBA) in the execution address hold register (reference numerals 32, 33, and 35 in FIG. 3) included in the control register group 110 and changes the status code to "011" (see FIG. 6D).

The cache control circuit 26 operates according to status code "011" and compares the address (LBA) registered at the end of the preceding command with the address (LBA) requested in the current access, thereby judging whether to hit the address (step S5). The preceding address (LBA) has been entered in the hit address entry register at the end of the write command. The cache control circuit 26 changes the status code to "101" when hitting the address and to "110" when not hitting the address (see FIGS. 6E and 6G). In the case of the read command process explained later, the cache control circuit changes the status code to "100" when having hit the address.

When the cache control circuit 26 has judged that the address is to be hit, the write data transferring circuit 28 stores the write data at the previously secured address in the buffer RAM 4 each time the transferring circuit receives the write data in sectors from the host system 2, and updates the command execution address (YES in step S6, and step S7). At the time when having stored all of the write data requested by the host system 2 in the buffer RAM 4, the write data transferring circuit 28 sets the status code in the command status register 21 at "000" (see FIG. 6F). The write data stored in the buffer RAM 4 is transferred to the drive side as the need arises, under the control of the CPU 5.

The command terminating circuit 29 operates according to status code "000" and after the completion of the write command process, clears the BUSY flag and outputs an interrupt signal to the host system 2 (step S10). The command terminating circuit 29 executes the command terminating process when the status code in the command status register 21 has changed from a status code other than "000" to status code "000." The command terminating circuit 29 waits for the CPU 5 to operate the command status register 21 and does not change the status code (request the change of the status code) by itself.

When the cache control circuit 26 has judged that the address is not to be hit, the status code in the command status register 21 has been set at "110." With status code "110," the command process unit 10 is out of operation unless the CPU 5 changes the contents of the command status register 21. The CPU 5 refers to the command register 36 included in the control register group 110 of the host interface 11 and thereby recognizes that the host system 2 has issued a write command. Then, the CPU 5 executes a preparatory operation to store the write data in the buffer RAM 4 (step S8). Specifically, the write data stored in the buffer RAM 4 by the preceding write command is transferred to the disk 3 side and then an area (address) to store the current write data is secured in the buffer RAM. When the preparatory operation has finished, the CPU 5 sets status code "101" in the command status register 21 (see FIG. 6H).

According to the status code "101," the write data transferring circuit 28 executes the same write data transfer process as described above (step S9). Specifically, each time receiving the write data in sectors from the host system 2, the write data transferring circuit 28 stores it in the buffer RAM 4 and updates the command execution address. Then, when having stored all of the write data requested by the host system 2 in the buffer RAM 4, the write data transferring circuit sets the status code in the command status register 21 at "000" (see FIG. 6I).

(Read command process)

Figure 5:
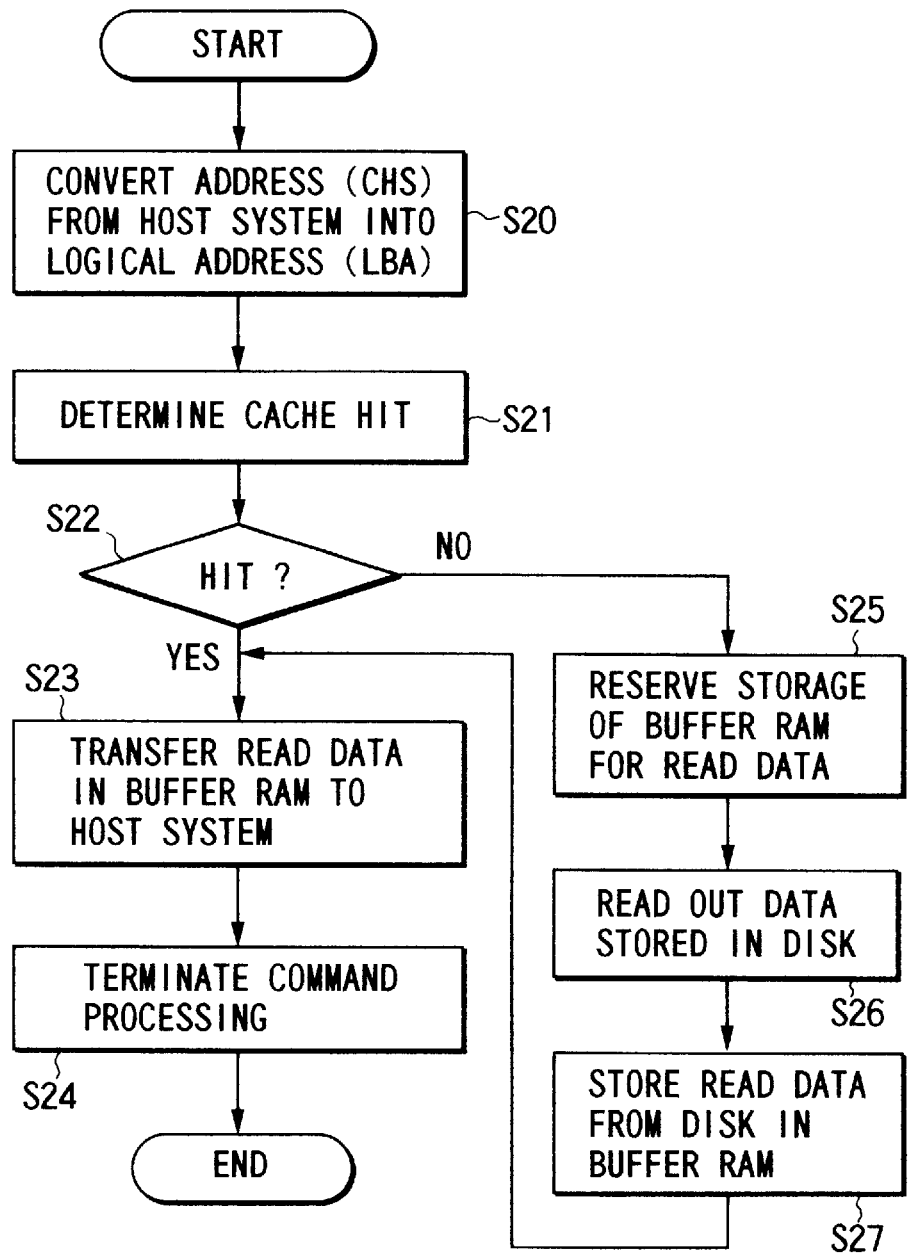
FIG. 5 is a flowchart to help explain a read command according to the first embodiment of the present invention.

Next, the read command process in the embodiment will be described by reference to the flowchart of FIG. 5.

Even when the command from the host system 2 is a read command, the processing is basically the same as with the above-described write command. Specifically, as shown in step S2 of FIG. 4, when the command accepting circuit 24 has recognized in the command recognition process that the command issued from the host system 2 is a read command, the command accepting circuit passes control to the read command process (NO in step S3).

Specifically, the address converting circuit 25 operates according to status code "010" and when the command execution address specified by the host system 2 is a physical address (CHS) consisting of a cylinder number, a head number, and a sector number, converts it into a logical block address (LBA), a serial address (step S20). The address converting circuit 25 sets the converted logical block address (LBA) in the execution address hold register (reference numerals 32, 33, and 35 in FIG. 3) included in the control register group 110 and changes the status code to "011."

The cache control circuit 26 operates according to status code "011" and compares the address (LBA) registered at the end of the preceding command with the address (LBA) requested in the current access, thereby judging whether to hit the address (step S21). The cache control circuit 26 changes the status code to "100" when hitting the address (YES in step S22). When not hitting the address, the cache control circuit changes the status code to "110' as in the case of a write command (NO in step S22).

The read data transferring circuit 27 operates according to status code "100" and, on the preceding read command, executes the process of transferring sector by sector the read data stored in the buffer RAM 4 to the host system 2 (step S23). The read data transferring circuit 27 sets the status code in the command status register 21 at "000" when the host system 2 has transferred all of the read data requested by the host system. This causes the command terminating circuit 29 to perform the command terminating process as described above (step S24).

When the cache control circuit 26 has judged that the address is not to be hit, the status code in the command status register 21 has been set at "110." As a result, control is passed to the CPU 5. The CPU 5 then executes the operation of reading the requested read data from the disk 3 (step S26). At this time, the CPU 5 executes a preparatory process to store the read data transferred from the disk 3 into the buffer RAM 4 (step S25). Namely, the CPU secures an area (address) for storing the read data in the buffer RAM 4. The CPU 5 stores the read data in sectors read from the disk 3 into the buffer RAM 4 (step S27).

The CPU 5 sets status code "100" in the command status register 21 when all of the requested read data in the buffer RAM 4. According to the status code "100," the read data transferring circuit 27 operates and executes the process of transferring sector by sector the read data stored in the buffer RAM 4 to the host system 2 (step S23).

As described above, with the present embodiment, in response to a command from the host system 2, the individual command processing circuits 23 to 29 in the command processing unit 10 execute a series of command processes independently on the basis of the status code in the command status register 21. In other words, a series of command processes is divided into a plurality of command processing steps and each of the command processing steps is executed in such a manner that it is controlled by the status code in the command status register 21. Since the embodiment is based on a method of dividing the command processes into a plurality of processing steps and executing each of the processing steps independently, not on a conventional method of performing command processes one after another, it is easy to find a defect on a process basis in designing an HDC 1. Even when a defect has been found after design, control of the command status register by the CPU 5 enables each of the command processes to be checked. Furthermore, a new command process can be added in a command process by setting a new status code, the flexibility in designing the HDC can be improved.

(Second embodiment)

FIGS. 7 and 8 relate to the command processing in a second embodiment of the present invention. In the second embodiment, it is assumed that the CPU 5 controls a command status circuit 20, or sets or changes the status code in a command status register 21 and processes a specific command from a host system 2.

Furthermore, in the second embodiment, a specific command is assumed to be a command that transfers data on the drive parameters of an HDD (information indicating the specifications of the drive including the number of heads) to the host system 2. Hereinafter, the second embodiment will be explained concretely.

The processing from when the host system 2 issued a specific command until the specific command has been accepted is the same as in the first embodiment. Specifically, as shown in FIG. 8A, in the command issue wait state, status code "000" has been set in the command status register 21. When the host system 2 has issued a specific command, a command waiting circuit 23 senses it and sets the status code in the command status register 21 at "001" (see FIG. 8B).

A command accepting circuit 24 executes a command accepting operation according to status code "001" and sets a BUSY flag in a drive status register 30 included in a control register group 110 (steps S30 and S31). When executing the command recognition process, the command accepting circuit 24 recognizes that the specific command has not been registered and changes the status code in the command status register 21 to "110" (see FIG. 8C). With status code "110," the command processing unit 10 is out of operation unless the CPU 5 changes the contents of the command status register 21.

The CPU 5 reads the specific command from the host system 2 from the command register 36 included in the control register group 110 and decodes it, thereby recognizing the specific command (step S32). According to the specific command, the CPU 5 secures an area for storing the drive parameter data in the buffer RAM 4 (step S33). The CPU 5 makes preparations by storing the drive parameter data read from a previously prepared memory (such as an nonvolatile EEPROM) or the disk 3 into the secured area of the buffer RAM 4 (step S34). Here, it is assumed that the amount of data prepared in the buffer RAM 4 is as much as one sector of data (i.e., 512 bytes of data). When the preparation for data transfer has been completed, the CPU 5 sets the status code in the command status register 21 at "100" (see FIG. 8D).

A read data transferring circuit 27 in the command processing unit 10 operates according to status code "100" and executes the process of transferring to the host system 2 the drive parameter data stored by the CPU 5 in the buffer RAM 4 (step S35). When having finished transferring the data requested by the host system 2, the read data transferring circuit 27 sets the status code in the command status register 21 at "000" (see FIG. 8E). According to status code "000," the command terminating circuit 29 executes a command terminating process as described above (step S36). This brings the command processing unit in the command issue waiting state. When the host system 2 has issued an ordinary read or write command, the command processing unit 10 executes a series of command processes (step S38).

As described above, it is possible for the command status circuit 20 including the command status register 21 to cause the CPU 5 to process a specific command that the host system 2 cannot cause the command process unit 10 in the HDC 1 to process. In other words, a new command not supported by the command processing unit 10 can be added, provided that the CPU 5 is caused to process it. This enables the host system 2 to exchange such data as the aforementioned drive parameter data with the CPU 5 of the HDD by issuing a specific command besides an ordinary read or write command. As a result, the flexibility of the command processing function of the HDC 1 can be increased, which facilitates the addition of a new function to the system including the HDD.

As described so far in detail, with the present invention, it is possible to realize a method of dividing a series of command processes on the host system into a plurality of command processing steps and executing and controlling each of the command processing steps independently. This makes it possible to grasp the operating state for each of the command processing steps into which the series of command processes has been divided. As a result, a defect in each of the command processing steps can be found easily, if any, in the stage of designing the HDC, which facilitates the change of design for improvement. Furthermore, a new command function can be added easily, provided that a CPU supports the command process that the HDC cannot support.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

I claim:

1. An apparatus that processes a command from a host system and controls data transfer between a disk drive and the host system, comprising:

means comprised of a plurality of command block means for executing command processing steps necessary for executing one command issued from the host system, the plurality of command block means corresponding in a one-to-one relationship to the command processing steps;

command status means for holding a status code set in advance in each of the command processing steps, the status code indicating a command processing step to be executed;

means for instructing the command block means to execute the command processing step indicated by the status code held in the command status means; and means for initializing a status code, which indicates a command processing step corresponding to start of execution of the command issued from the host system, to the command status means, setting a status code, which indicates command processing steps to be executed in sequence until completion of execution of the command, to the command status means, and updating a set status code to a status code for indicating a command processing step to be executed next when execution of a command processing step indicated by the set status code is completed.

2. An apparatus according to claim 1, wherein said means for instructing the command block means includes means for outputting to the relevant command block means an enable signal for executing the command processing step corresponding to said status code set in said command status means.

3. An apparatus according to claim 1, wherein the commands issued from said host system include a write command for writing data onto a disk in said disk drive and a read command for reading the recording data from said disk; and said command block means includes command processing circuits which perform the following command processing steps independently: a command accepting processing step for accepting and recognizing said write command or said read command, an address conversion processing step for setting an address to write or read the data to be accessed onto or from said disk, a write data transfer processing step for transferring the write data to said disk drive according to said write command, a read data transfer processing step for transferring the read data to said host system according to said read command, and a specific command terminating processing step.

4. An apparatus according to claim 3, further comprising buffer memory means for storing said write data and said read data, wherein said command block means includes a cache processing circuit for performing a cache processing step, said cache processing circuit performing control in such a manner that when the address to be accessed is in said buffer memory means according to said write command, the command processing circuit stores said write data from said host system in said buffer memory means and that when the read data to be accessed is in said buffer memory means according to said read command, the cache processing circuit transfers said read data from the buffer memory means to said host system.

5. An apparatus according to claim 4, wherein said cache processing circuit executes a hit judging process of judging whether or not the address to be accessed specified by said write command from said host system has been secured in said buffer memory means and, when the address has been hit, stores said write data at the address secured in said buffer memory means and, when the address has not been hit, performs control so as to secure an address for storing said write data in said buffer memory means, and further executes a hit judging process of judging whether or not the read data at the address specified by said read command from said host system has been stored in said buffer memory means and, when the address has been hit, performs control so as to transfer said read data from said buffer memory means to said host system and, when the address has not been hit, performs control so as to secure an address for storing said read data in said buffer memory.

6. An apparatus according to claim 1, further comprising

CPU means for controlling the reading and writing of data from and onto a disk in said disk drive, said CPU means not only performing control so as to record onto said disk the write data transferred from said host system to said disk drive or reproduce from said disk the read data transferred from said disk drive to said host system, but also having the function of referring to and changing the status code held in said command status means.

7. The apparatus according to claim 1, wherein the status code initialized to the command status code is a status code for indicating a command processing step corresponding to command issue wait processing of a command supplied from the host system.

8. An apparatus that processes a command from a host system and controls data transfer between a disk drive and the host system, comprising:

means comprised of a plurality of command block means for executing command processing steps necessary for executing one command issued from the host system, the plurality of command block means corresponding in a one-to-one relationship to the command processing steps;

command status means having register means for holding a status code set in advance in each of the command processing steps, the status code indicating a command processing step to be executed;

means for outputting an enable signal for instructing the command block means to execute the command processing step indicated by the status code held in the register means; and CPU means for decoding the command issued from the host system, determining the command processing steps necessary for execution of the decoded command, setting a status code for indicating a series of command processing steps from start to end of the execution of the command in the register means, and updating the set status code to a status code for indicating a command processing step to be executed next when execution of a command processing step indicated by the set status code is completed.

9. An apparatus according to claim 8, wherein the CPU means executes a specific processing step which, according to the specific command from said host system, prepares the drive parameter data requested by said host system and transfers it to said host system and which sets in said register means a status code for causing a read data transfer processing circuit to function and forces said read data transfer processing circuit to transfer the data requested by said host system to said host system.

10. An apparatus according to claim 8, wherein the CPU means controls the reading and writing of data from and onto a disk in said disk drive and performs control so as to record on said disk the write data transferred by a write data transfer processing circuit from said host system to said disk drive and reproduce from said disk the read data transferred by said read data transfer processing circuit from said disk drive to said host system on the basis of a series of command processing steps by said command block means.

11. A method of processing commands for a drive controller that controls data transfer between a disk drive and a host system and that has register means in which a status code is set for each of a series of command processing steps and executes said series of command processing steps sequentially according to the status code set in said register means, the method comprising:

the step of accepting a command from said host system and recognizing said command;

the step of converting an address to be accessed included in said command into a specific address;

the step of transferring the write data from said host system to said disk drive when said command is a write command or transferring the read data read from said disk drive to said host system when said command is a read command; and the step of, when said series of command processing steps has been completed, executing a command terminating processing step where control goes to a wait state in which a subsequent command will be accepted.

12. A method according to claim 11, wherein the drive controller includes buffer memory means for storing said write data or said read data, the method further comprising:

the step of executing a hit judging process of judging whether or not the address to be accessed specified by said write command from said host system has been secured in said buffer memory means and storing said write data at the address secured in said buffer memory means when the address has been hit or performing control so as to secure an address for storing said write data in said buffer memory means when the address has not been hit, and of executing a hit judging process of judging whether or not the read data specified by said read command from said host system has been stored in said buffer memory means and performing control so as to transfer said read data from said buffer memory means to said host system when the address has been hit or performing control so as to secure an address for storing said read data in said buffer memory means when the address has not been hit.

13. A method according to claim 11, wherein the drive controller includes CPU means that refers to and sets the status code held in said register means and that recognizes a specific command from said host system, the method further comprising:

the step of setting in said register means a status code corresponding to the command process corresponding to said specific command; and the step of executing a command process corresponding to the specific process corresponding to said specific command according to the status code set in said register means.

* * * * *